United States Patent
Puñet Plensa et al.

(10) Patent No.: US 10,125,280 B2
(45) Date of Patent: Nov. 13, 2018

(54) WATER BASED INKJET FORMULATIONS

(71) Applicant: KAO Corporation, S.A., Barberà del Vallès (ES)

(72) Inventors: Antoni Puñet Plensa, Barberà del Vallès (ES); Satoshi Kunii, Barberà del Vallès (ES)

(73) Assignee: KAO Corporation, S.A., Barbera del Valles (ES)

( * ) Notice: Subject to any disclaimer, the term of this patent is extended or adjusted under 35 U.S.C. 154(b) by 0 days.

(21) Appl. No.: 15/167,163

(22) Filed: May 27, 2016

(65) Prior Publication Data

US 2017/0022382 A1    Jan. 26, 2017

(30) Foreign Application Priority Data

May 28, 2015 (EP) .................................... 15382279

(51) Int. Cl.
| | |
|---|---|
| *B41J 2/01* | (2006.01) |
| *C09D 11/107* | (2014.01) |
| *C09D 11/106* | (2014.01) |
| *C09D 11/322* | (2014.01) |
| *C09D 11/38* | (2014.01) |

(52) U.S. Cl.
CPC .............. *C09D 11/107* (2013.01); *B41J 2/01* (2013.01); *C09D 11/106* (2013.01); *C09D 11/322* (2013.01); *C09D 11/38* (2013.01)

(58) Field of Classification Search
CPC ..... C09D 11/322; C09D 11/30; C09D 11/106; C09D 11/36; C09D 11/02; C09D 11/037; C09D 11/107; C09D 11/38; B41J 2/01
USPC ................................................... 347/20, 100
See application file for complete search history.

(56) References Cited

U.S. PATENT DOCUMENTS

| | | | |
|---|---|---|---|
| 6,239,193 B1 | 5/2001 | Cheng et al. | |
| 6,426,375 B1 | 7/2002 | Kubota | |
| 2003/0105187 A1* | 6/2003 | Iijima | C09D 11/322 523/160 |
| 2006/0241232 A1* | 10/2006 | Garces | C08K 3/34 524/444 |
| 2011/0171386 A1 | 7/2011 | Ganapathiappan et al. | |

FOREIGN PATENT DOCUMENTS

| | | |
|---|---|---|
| EP | 1 074 589 A1 | 2/2001 |
| EP | 2 287 245 A1 | 2/2011 |
| EP | 2 865 531 A1 | 4/2015 |
| EP | 3 034 572 A1 | 6/2016 |
| WO | WO 2004/101691 A2 | 11/2004 |
| WO | WO 2005/115763 A1 | 12/2005 |
| WO | WO 2011/019866 A1 | 2/2011 |

OTHER PUBLICATIONS

European Search Report for Application No. EP 15382279.6 dated Oct. 19, 2015.
Hudd, The Chemistry of Inkjet Inks. Chapter 1: Inkjet Printing Technologies. Singapore. World Scientific Publishing Co Pte Ltd. Ed. Shlomo Magdassi. Jul. 3-18, 2009.
Khan, Pigment Ink Formulation, Tests and Test methods for Pigmented Textile Inks. Chemistry and Materials Research. 2016;8(8):78-86.
Guo et al., Preparation and Properties of Blue Edible Inkjet Ink Based on Chitosan Oligochitosan. Chemical Engineering Transactions. 2016;51:1207-12.

* cited by examiner

*Primary Examiner* — Jannelle M Lebron
(74) *Attorney, Agent, or Firm* — Wolf, Greenfield & Sacks, P.C.

(57) ABSTRACT

The present invention relates to an inkjet printing composition comprising an aqueous liquid vehicle, a pigment and a nitrile polymer emulsion; to an inkjet printing system comprising an inkjet composition, a recording medium and an inkjet printer; to a method of forming a printed image with an inkjet printing system and to the use of an inkjet printing composition in an inkjet printing system.

13 Claims, No Drawings

WATER BASED INKJET FORMULATIONS

The present application claims priority to European Patent Application No. 15 382 279.6, filed May 28, 2015, the entire contents of which is hereby incorporated by reference.

FIELD OF THE INVENTION

The present invention relates to an inkjet printing composition comprising an aqueous liquid vehicle, a pigment and a nitrile polymer emulsion; to an inkjet printing system comprising an inkjet composition, a recording medium and an inkjet printer; to a method of forming a printed image with an inkjet printing system and to the use of an inkjet printing composition in an inkjet printing system.

STATE OF THE ART

Inkjet printing is a digital printing method wherein droplets of ink are directly projected onto a recording medium from very fine nozzles and allowed to adhere to the recording medium, to form images or characters. Inkjet printing has become rapidly spread because of various advantages such as easiness of full coloration, low cost, capability of using different types of recording medium, etc.

The inks used for inkjet printing include water-based ink, oil-based ink, solvent-based ink (non-aqueous) and solid ink. In recent years, and in order to reduce the environmental impact of the inks, there has been a tendency towards the use of water-based inks. Water-based inks comprise water or an aqueous solution as main component, and a colorant such as a dye or pigment. However it is preferred, in order to impart a good weathering resistance and good water resistance to printed matters, to use a water-based ink containing a pigment as the colorant component.

There also is an increasing demand for commercial printed matters printed on low-liquid absorbing coated paper such as an offset-coated paper, or even a non-liquid absorbing recording media, such as, for instance a polyvinyl chloride resin film, a polypropylene resin film or a polyester resin film.

In order to print images or characters on the low-liquid absorbing or non-liquid absorbing media by ink-jet printing methods, certain problems have to be solved. One of them is the prolonged drying time due to poor absorption, another one is the deterioration of the image due to rub fastness early after printing: it is known that, unlike a plain paper in which a pigment is likely to be penetrated, the low-liquid or the non-liquid absorbing media tend to suffer from deposition of pigment particles remaining thereon. These pigment particles are directly susceptible to an external force or agent, so that the images or characters printed on these recording media tend to be deteriorated even after being dried. Finally, another problem is the deterioration of images or characters due to the exposure of the printed recording media to water or organic solvents.

One of the most common approaches to overcome these problems is the use of water insoluble polymers for print adhesion and durability. The water-based inks can incorporate water insoluble polymers that accelerate the fixation of the pigment onto the surface of the recording medium and thus provide a more robust image or character. Besides, it is already known in the prior art that the use of some polymer emulsions, or polymer latex, have the effect of forming a film on the recording medium to improve the rubbing resistance of the printed image or character.

In addition to the provision of a more robust image, the inkjet ink composition must meet a number of requirements, including:

The ink should be capable of being stored for a long period of time without causing clogging of printhead orifices during use;

The ink should show a quick drying with no coagulation, and should form a continuous film during drying;

The ink should be able to be jetted upon different recording media with good printed images or characters.

To obtain a more robust image, as well as the provision of the described requirements, a number of solutions have been already described in the prior art.

For example, US2011171386 proposes an inkjet printing composition comprising an aqueous liquid vehicle, at least one pigment and a polymer latex, wherein the polymer latex comprises a polymerized mixture of styrene, butyl acrylate, at least one of methacrylonitrile or acrylonitrile, methacrylic acid and ethylene glycol dimethacrylate. The glass transition temperature of the latex polymer is 40-80° C. The inkjet printing composition provides a durable print film for increased waterfastness and rub resistance.

U.S. Pat. No. 6,426,375 describes an inkjet recording method for non-liquid absorbing media. The method comprises depositing a reaction solution (comprising a reactant which produces a coagulate) and an ink composition (comprising a pigment and a polymer emulsion) to a non-liquid absorbing medium to perform printing. The inkjet printing composition shows good ink fixation on non-absorbing recording media.

U.S. Pat. No. 6,239,193 describes an inkjet ink prepared by mixing ink vehicle, colorant and latex polymers. The latex polymer is generated by the polymerization of a mixture of olefinic monomers in the presence of a nonionic polyethoxylated surfactant. The resulting ink exhibits no kogation or heater deposits when used with nonionic surfactant stabilized latex that complements the colorant.

From the state of the art set forth above, it can be seen that the preparation of inkjet printing formulations is a complex problem and is far from being considered completely solved. It can also be seen that already several approaches with polymer emulsions have been described. However, there is still a need for inkjet printing formulations able to meet all technical requirements related to its application: good abrasion resistance and good solvent resistance of the printed recording medium, as well as good ink storage stability to avoid clogging of printhead orifices during use, no ink coagulation and continuous film formation during drying, and the possibility to jet the ink upon different recording media obtaining good printed images or characters.

SUMMARY OF THE INVENTION

The first object of the present invention is an inkjet printing composition comprising: (a) an aqueous liquid vehicle, (b) at least a pigment and (c) at least a nitrile polymer emulsion.

A further object of the present invention is an inkjet printing composition comprising: (a) an aqueous liquid vehicle, (b) at least a pigment and (c) at least a nitrile polymer emulsion, said polymer emulsion comprising at least one of carboxylated acrylonitrile butadiene polymer emulsion or at least one of carboxylated acrylonitrile butadiene styrene polymer emulsion.

Another object of the present invention is an inkjet printing system comprising an inkjet printing composition according to the present invention, a non-absorbing recording medium and an inkjet printer.

A method of forming a printed image with an inkjet printing system according to the present invention is also part of the invention.

Another object of the present invention is the use of an inkjet printing composition in an inkjet printing system.

DETAILED DESCRIPTION OF THE INVENTION

The main object of the present invention is an inkjet printing composition comprising:
(a) an aqueous liquid vehicle
(b) at least a pigment
(c) at least a nitrile polymer emulsion
(a) Aqueous Liquid Vehicle The present invention comprises an aqueous liquid vehicle that refers to the fluid wherein the pigment according to the present invention can be dispersed or dissolved to form an inkjet ink.

The liquid vehicle may be chosen according to its suitability with a particular inkjet printing system or for use in a particular print medium.

Additional co-solvents may be included in the aqueous liquid vehicle. These co-solvents are known in the state of the art to be suitable to be formulated within aqueous inkjet inks. Suitable water soluble organic co-solvents, but not limited to, are aliphatic alcohols, aromatic alcohols, diols, triols, glycol ethers, poly(glycol)ethers, lactams, formamides, acetamides, long chain alcohols, ethylene glycol, propylene glycol, diethylene glycol, triethylene glycol, glycerine, dipropylene glycol, glycol butyl ether, polyethylene glycols, polypropylene glycols, amides, ethers, carboxylic acid esters, organosulfides, organosulfoxides, sulfones, alcohol derivatives, carbitol, butyl carbitol, cellosolve, ether derivatives, amino alcohols, pyrrolidones and ketones.

The co-solvent included in the liquid vehicle may have a vapour pressure such that it will evaporate under heating at least as quickly as the water in the vehicle.

In an embodiment of the present invention, the inkjet printing composition of the present invention further comprises an organic co-solvent.

(b) Pigment

The present invention comprises a pigment. The pigment may be either an inorganic pigment or an organic pigment. The pigment may also be used in combination with an extender pigment, if required.

Examples of the inorganic pigment include carbon blacks and metal oxides. In particular, carbon blacks are preferably used for black-water based inks. The carbon blacks may include furnace blacks, thermal lamp blacks, acetylene blacks and channel blacks.

Examples of organic pigments include azo pigments, diazo pigments, phtalocyanine pigments, quinacridone pigments, isoindoline pigments, dioxazine pigments, perylene pigments, perinone pigments, thioindigo pigments, anthraquinone pigments and quinophtalone pigments.

The shade of the organic pigment used in the present invention is not particularly limited, and there may be used any chromatic colour pigment having a yellow colour, a magenta colour, a cyan colour, a blue colour, a red colour, an orange colour, a green colour, etc.

Specific examples of the preferred organic pigments include one or more pigments selected from the group consisting of commercially available products marketed under the tradenames C.I. Pigment Yellow, C.I. Pigment Red, C.I. Pigment Orange, C.I. Pigment Violet, C.I. Pigment Blue and C.I. Pigment Green, etc.

In an embodiment of the present invention, the pigment contained in the water-based ink is in the form of a self-dispersible pigment, a dispersant-dispersed pigment or as pigment-containing water-insoluble polymer particles.

In a preferred embodiment of the present invention it is preferred that the pigment contained in the water based ink is in the form of a pigment-containing water-insoluble polymer particles (also referred to merely as "pigment-containing polymer particles").

The pigment-containing polymer particles may be prepared, for example, as described in WO2014098001. The pigment-containing polymer can be obtained by subjecting a mixture of a water insoluble polymer, an organic solvent, a pigment and water to dispersion treatment to obtain a dispersion of pigment-containing polymer particles; and removing the organic solvent from the dispersion to obtain a water dispersion of the pigment containing polymer particles (also referred as "pigment water dispersion"

The Nitrile Polymer Emulsion

The present invention comprises a nitrile polymer emulsion.

In an embodiment of the present invention, the nitrile polymer emulsion comprises
at least one of carboxylated acrylonitrile butadiene polymer emulsion, and/or
at least one of carboxylated acrylonitrile butadiene styrene polymer emulsion.

The preparation of a nitrile polymer emulsion is already described in the prior art. EP2251744 describes the preparation of the carboxylated acrylonitrile butadiene polymer latex (XNBR) by terpolymerizing acrylic acid as the third component of an acrylonitrile butadiene rubber to introduce a carboxyl group into the side chain of the polymer or the terminal thereof.

U.S. Pat. No. 5,132,370 describes the preparation of a carboxylated acrylonitrile styrene butadiene polymer latex (XNBSR) by carboxylating a styrenic resin by melt-mixing a mixture comprising a preformed graft polymer comprising styrene, acrylonitrile and butadiene, maleimide or N-phenyl maleimide and optionally a free radical initiator.

In another embodiment of the present invention, the nitrile polymer emulsion preferably comprises
at least one of carboxylated acrylonitrile butadiene styrene polymer emulsion.

Suitable examples of carboxylated acrylonitrile butadiene polymer emulsion and carboxylated acrylonitrile styrene butadiene polymer emulsion according to the invention are commercially available materials from Emerald Performance Materials, such as Nychem™ 1571X12 (carboxylated butadiene acrylonitrile latex), Nychem™ 1578X1 (carboxylated butadiene acrylonitrile styrene latex), as well as carboxylated acrylonitrile butadiene polymer emulsion and carboxylated acrylonitrile styrene butadiene polymer emulsion from Nipol Latex series (available from Zeon Corporation) and Krynac series (available from Lanxess).

In an embodiment of the present invention, the glass transition temperature of the emulsion polymer can be in the range from $-50°$ C. to $+40°$ C., preferably from $-30°$ C. to $+30°$ C.

Surfactant:

In a preferred embodiment of the present invention, the inkjet ink composition further comprises (d) a surfactant.

Examples of the surfactant include anionic surfactants such as alkyl sulfates, alkyl ether sulfates, alkyl ether carboxylic acids and/or salts thereof, sulfosuccinates and mixtures thereof; and non-ionic surfactants such as salts of fatty acids, salts of higher alcohol esters, ethylene oxide adducts of higher alcohols, ethylene oxide adducts of alkylphenol, ethylene oxide adducts of polyhydric alcohol fatty acid esters, acetylene glycol, and ethylene oxide adducts of acetylene glycol Examples of anionic surfactants of the alkylsulfate type available are those corresponding to the commercial references EMAL® ION, EMAL® 10G or EMAL® 30E (INCI Sodium Lauryl Sulfate), and EMAL® 40TE (INCI TEA Lauryl Sulfate), all marketed by KAO Chemicals Europe.

Examples of anionic surfactants of the alkylethersulfate type are those corresponding to the commercial references EMAL® 270D, EMAL® 270E, EMAL® 227D or EMAL® 227E (INCI name Sodium Laureth Sulfate), all marketed by KAO Chemicals Europe.

Examples of anionic surfactants of the alkyl ether carboxylic acid type are C6-C22 alkyl ether carboxylic acid and/or salts thereof. They are available with the commercial reference AKYPO® RLM45CA (INCI Laureth-6 Carboxylic Acid), AKYPO® RLM45N (INCI Sodium Laureth-6 Carboxylate), AKYPO® SOFT 45NV (INCI Sodium Laureth-6 Carboxylate), AKYPO® RLM 70 (INCI Laureth-8 Carboxylic Acid), AKYPO® RLM 100 (INCI Laureth-11 Carboxylic Acid) AKYPO® SOFT 100 BVC (INCI Sodium Laureth-11 Carboxylate) all marketed by KAO Chemicals Europe.

Examples of sulfosuccinate anionic surfactants are commercially available SUCCIDET® NES or SUCCIDET® S30 (INCI Disodium Laureth Sulfosuccinate), marketed by KAO Chemicals Europe.

Examples of surfactants are also non-ionic surfactants such as fatty acids and their esters, salts of higher alcohol esters, ethylene oxide adducts of higher alcohols, for example from the EMULGEN series marketed by Kao Chemicals Europe, ethylene oxide adducts of alkylphenol, ethylene oxide adducts of polyhydric alcohol fatty acid esters, acetylene glycol, and ethylene oxide adducts of acetylene glycol, for example SURFYNOL 104, 440, 465, or TG manufactured by Air Products and Chemicals Inc. and OLFINE E1010 manufactured by Nissin Chemical Industry Co., Ltd. Other possible non-ionic surfactants are xylitol esters, alkoxylated and non-alkoxylated sorbitan esters, for example KAOPAN series marketed by KAO Chemicals Europe; esters of sugars, such as glucose, fructose, galactose, mannose, xylose, arabinose, ribose, 2-deoxyribose and sucrose; C8-18 fatty alcohols; optionally alkoxylated glycerol esters, for example LEVENOL series marketed by KAO Chemicals Europe; ethoxylated polyglycerol esters, for example HOSTACERIN DGL and HOSTACERIN DGSB marketed by Clariant; alkyl polyglucosides, for example AG-10LK, marketed by Kao Japan; and alkoxylated or non-alkoxylated pentaerythritol esters, for example RADIA 7171 and RADIA 7176, marketed by Oleofina. Non-ionic surfactants with amide groups, among which there may be mentioned derivatives of amine, such as glucamine, for example MEDIALAN GAC and MEDIALAN GAL marketed by Clariant, and also derivatives of methylethanolamine, diethanolamine, isopropanolamine and monoethanolamine, with linear or branched fatty acids.

Inkjet Printing Composition

The composition according to the present invention is an inkjet printing composition comprising:
(a) an aqueous liquid vehicle;
(b) at least a pigment;
(c) at least a nitrile polymer emulsion comprising
at least one of carboxylated acrylonitrile butadiene polymer emulsion and/or
at least one of carboxylated acrylonitrile butadiene styrene polymer emulsion.

In an embodiment of the present invention, the composition according to the invention comprises:
(a) an aqueous liquid vehicle;
(b) at least a pigment;
(c) at least a nitrile polymer emulsion preferably comprising at least one of carboxylated acrylonitrile butadiene styrene polymer emulsion.

In an embodiment of the present invention, the composition according to the invention comprises:
(a) an aqueous liquid vehicle, comprising a co-solvent;
(b) at least a pigment;
(c) at least a nitrile polymer emulsion comprising
at least one of carboxylated acrylonitrile butadiene polymer emulsion, and/or
at least one of carboxylated acrylonitrile butadiene styrene polymer emulsion.

In another embodiment of the present invention, the composition according to the invention comprises:
(a) an aqueous liquid vehicle, comprising a co-solvent;
(b) at least a pigment;
(c) at least a nitrile polymer emulsion preferably comprising at least one of carboxylated acrylonitrile butadiene styrene polymer emulsion.

In an embodiment of the present invention, the composition according to the invention comprises:
(a) an aqueous liquid vehicle;
(b) at least a pigment;
(c) at least a nitrile polymer emulsion comprising
at least one of carboxylated acrylonitrile butadiene polymer emulsion, and/or
at least one of carboxylated acrylonitrile butadiene styrene polymer emulsion;
(d) at least a surfactant In another embodiment of the present invention, the composition according to the invention comprises:
(a) an aqueous liquid vehicle;
(b) at least a pigment;
(c) at least a nitrile polymer emulsion preferably comprising at least one of carboxylated acrylonitrile butadiene styrene polymer emulsion;
(d) at least a surfactant In an embodiment of the present invention, the composition according to the invention comprises:
(a) an aqueous liquid vehicle, comprising a co-solvent;
(b) at least a pigment;
(c) at least a nitrile polymer emulsion comprising
at least one of carboxylated acrylonitrile butadiene polymer emulsion, and/or
at least one of carboxylated acrylonitrile butadiene styrene polymer emulsion;
(d) at least a surfactant In another embodiment of the present invention, the composition according to the invention comprises:
(a) an aqueous liquid vehicle, comprising a co-solvent;
(b) at least a pigment;
(c) at least a nitrile polymer emulsion preferably comprising at least one of carboxylated acrylonitrile butadiene styrene polymer emulsion;
(d) at least a surfactant In an embodiment of the present invention, the composition according to the present invention comprises the individual components in the following amounts, expressed as percentage by weight, with respect to the total weight of the composition:
(a) an aqueous liquid vehicle;
(b) 1 to 15 wt. % preferably 3 to 8 wt. % of at least a pigment;
(c) 1 to 15 wt. % preferably 3 to 9 wt. % of solid content of at least a nitrile polymer emulsion comprising
at least one of carboxylated acrylonitrile butadiene polymer emulsion, and/or
at least one of carboxylated acrylonitrile butadiene styrene polymer emulsion;

In another embodiment of the present invention, the composition according to the present invention comprises:
(a) an aqueous liquid vehicle;
(b) 1 to 15 wt. % preferably 3 to 8 wt. % of at least a pigment;
(c) 1 to 15 wt. % preferably 3 to 9 wt. % of solid content of at least a nitrile polymer emulsion preferably comprising at least one of carboxylated acrylonitrile styrene polymer emulsion.

In an embodiment of the invention, the composition comprises:
(a) an aqueous liquid vehicle, further comprising from 10 to 60% wt., preferably 20 to 40 wt. % in respect of total composition of a co-solvent;
(b) 1 to 15% wt., preferably 3 to 8 wt. % of at least a pigment;
(c) 1 to 15 wt. % preferably 3 to 9% wt of solid content of at least a nitrile polymer emulsion comprising
at least one of carboxylated acrylonitrile butadiene polymer emulsion, and/or
at least one of carboxylated acrylonitrile butadiene styrene polymer emulsion.

In another embodiment of the invention, the composition comprises:
(a) an aqueous liquid vehicle, further comprising from 10 to 60% wt., preferably 20 to 40 wt. % in respect of total composition, of co-solvent
(b) 1 to 15% wt., preferably 3 to 8 wt. % of at least a pigment;
(c) 1 to 15 wt. %, preferably 3 to 9 wt. % of solid content of at least a nitrile polymer emulsion preferably comprising at least one of carboxylated acrylonitrile butadiene styrene polymer emulsion.

In an embodiment of the invention, the composition comprises:
(a) an aqueous liquid vehicle;
(b) 1 to 15% wt, preferably 3 to 8% wt of at least a pigment;
(c) 1 to 15 wt. % preferably 3 to 9 wt. % of solid content of at least a nitrile polymer emulsion comprising
at least one of carboxylated acrylonitrile butadiene polymer emulsion, and/or
at least one of carboxylated acrylonitrile butadiene styrene polymer emulsion;
(d) 0.1 to 10 wt. %, preferably 0.5 to 6 wt. % of at least a surfactant.

In another embodiment of the invention, the composition comprises:
(a) an aqueous liquid vehicle;
(b) 1 to 15% wt., preferably 3 to 8 wt. % of at least a pigment;
(c) 1 to 15% wt., preferably 3 to 9 wt. % of solid content of at least a nitrile polymer emulsion preferably comprising at least one of carboxylated acrylonitrile butadiene styrene polymer emulsion;
(d) 0.1 to 10% wt., preferably 0.5 to 6 wt. % of at least a surfactant.

In other embodiment of the present invention, the composition comprises:
(a) an aqueous liquid vehicle, comprising from 10 to 60% wt., preferably 20 to 40 wt. % in respect of total composition of a co-solvent;
(b) 1 to 15% wt., preferably 3 to 8% wt of at least a pigment;
(c) 1 to 15% wt., preferably 3 to 9% wt of solid content of at least a nitrile polymer emulsion comprising
at least one of carboxylated acrylonitrile butadiene polymer emulsion, and/or
at least one of carboxylated acrylonitrile butadiene styrene polymer emulsion;
(d) 0.1 to 10% wt, preferably 0.5 to 6% wt of at least a surfactant.

In another embodiment of the invention, the composition comprises:
(a) an aqueous liquid vehicle, comprising from 10 to 60 wt. %, preferably 20 to 40 wt. % in respect of total composition of a co-solvent;
(b) 1 to 15 wt. %, preferably 3 to 8 wt. %, of at least a pigment;
(c) 1 to 15 wt. %, preferably 3 to 9 wt. % of solid content of at least a nitrile polymer emulsion preferably comprising at least a carboxylated acrylonitrile butadiene styrene polymer emulsion
(d) 0.1 to 10 wt. %, preferably 0.5 to 6 wt. % of at least a surfactant The inkjet printing composition can further include other additives such as biocides, wetting agents, humectants, buffering agents, viscosity modifiers, sequestering agents, thickeners, conductivity enhancing agents, anti-kogation agents, drying agents, waterfast agents, binders, light stabilizers, anti-mold agents, anti-curl agents, defoamers and stabilizing agents Inkjet Printing System Another embodiment of the present invention is an inkjet printing system.

The inkjet printing system comprises:
(i) an inkjet printing composition according to the present invention;
(ii) a recording medium
(iii) an inkjet printer
(ii) Recording Medium:

The recording medium for the inkjet ink composition of the present invention includes well known recording media for the person skilled in the art. Well known recording media include plain paper and coated and uncoated media, as well as non-porous substrates such as glass, metals and plastics.

In a preferred embodiment of the present invention, the recording medium is a low-liquid absorbing or a non-liquid absorbing medium.

In a more preferred embodiment of the present invention, the recording medium is a non-liquid absorbing medium.

Low-liquid absorbing medium refers to a recording medium wherein the water absorption as measured for a contact time of 100 ms with water is not higher than 6 g/m$^2$.

Non-liquid absorbing medium refers to a recording medium wherein the water absorption as measured for a contact time of 100 ms with water is not higher than 3 g/m$^2$.

The recording medium for the inkjet printing composition of the present invention may be a coated paper or a film. Examples of the coated paper include "OK Topcoat+" (available from Oji Paper Co., Ltd.; basis weight: 104.7 g/m$^2$; 60° gloss: 49.0; water absorption as measured in a pure water contact time of 100 ms (hereinafter defined in the same way): 4.9 g/m$^2$), a multi-color foam gloss coated paper (available from Oji Paper Co., Ltd.; basis weight: 104.7 g/m$^2$; 60° gloss: 36.8; water absorption: 5.2 g/m$^2$), "UPM Finesse Gloss" (available from UPM; basis weight: 115 g/m$^2$; 60° gloss: 27.0; water absorption: 3.1 g/m$^2$), "UPM Finesse Matt" (available from UPM; basis weight: 115 g/m$^2$; 60° gloss: 5.6; water absorption: 4.4 g/m$^2$), "TerraPress Silk" (available from Stora Enso; basis weight: 80 g/m$^2$; 60° gloss: 6.0; water absorption: 4.1 g/m$^2$), and "LumiArt" (available from Stora Enso; basis weight: 90 g/m$^2$; 60° gloss: 26.3).

Examples of the non-liquid absorbing medium include a polyester film, a vinyl chloride film, a polypropylene film, a polyethylene film and a nylon film. These films may be subjected to surface treatments such as corona treatment, etc., if required.

Examples of the generally available films include "LUMIRROR T60" (available from Toray Industries Inc.; polyethylene terephtalate; thickness: 125 μm; 60° gloss: 189.1; water absorption: 2.3 g/m$^2$), "LUMIRROR 75T60" (available from Toray Industries Inc.; polyethylene terephtalate), "BONPET 8A" (available from Bonset America, polyethylene terephtalate), "PVC80B P" (available from Lintec Corp.; polyvinyl chloride, 60° gloss: 58.8; water absorption: 1.4 g/m$^2$), "RENOLITSHRINK TD57S" (available from Renolit AG, polyvinyl chloride), "KINATH KEE 70CA" (available from Lintec Corp.; polyethylene), "YUPO SG90 PAT1" (available from Lintec Corp.; polypropylene), "BONYL RX" (available from Kohjin Film & Chemical Co. Ltd.; nylon).

(iii) Inkjet Printer:

The inkjet printing composition of the present invention is filled into a a container that is mounted to an inkjet printing apparatus equipped with ink ejecting means, and the inkjet printing composition of the invention is thus ejected onto the recording medium for inkjet printing to print images or characters thereon.

The inkjet printing apparatus can further be equipped with a heating device in order to heat the recording medium at or near the time of printing. Alternatively, the heating device can be used to heat the ink during or after jetting onto the medium.

In an embodiment of the present invention, the inkjet printing system comprises:

(i) an inkjet printing composition according to the present invention, (ii) a recording medium, preferably a low-liquid absorbing recording medium or a non-absorbing recording medium and (iii) an inkjet printer comprising a heating device; wherein the system is configured such that on application of heat from the heating device to the inkjet ink printed on the recording medium, the polymer emulsion particles fuse, thereby forming a printed image or character with a film encapsulating at least a portion of the pigment in the recording medium.

Method of Formation of Printed Image:

In another embodiment, the present invention provides a method of forming a printed image or character with an inkjet printing system comprising the steps of:

filling a container comprised within the inkjet printing apparatus equipped with an ink ejecting means with an inkjet ink composition according to the invention ejecting the inkjet ink composition onto the recording medium to print images or characters thereon.

In another embodiment of the present invention, the inkjet printing apparatus can further comprise a heating device. Without being bound by any theory, on application of heat from the heating device to the inkjet ink printed on the recording medium, at least a portion of the polymer emulsion particles fuse, thereby forming a printed image or character with a film encapsulating at least a portion of the pigment in the recording medium.

Use of the Inkjet Ink Composition:

In another embodiment, the present invention provides a use of the inkjet ink composition according to the present invention in an inkjet printing system.

EXAMPLES

First part of the experimental section (Example 1) corresponds to the preparation of the inkjet ink composition according to the present invention.

Second part of experimental section (Example 2) refers to the performance of abrasion resistance and solvent resistance of the inkjet ink compositions of the present invention.

Example 1: Inkjet Ink Compositions 1.a Preparation of the Water Dispersion of Pigment-Containing Water-Insoluble Polymer Particles:

(i) Synthesis of Water-Insoluble Polymer:

Forty six (46) parts of styrene (available from Wako Pure Chemical Industries, Ltd.), 14 parts of methacrylic acid (available from Wako Pure Chemical Industries, Ltd.), 30 parts of a styrene macromonomer "AS-6S" (available from Toagosei Co., Ltd.; molecular weight: 6000; solid content: 50%) and 50 parts of polypropylene glycol methacrylate "BLEMMER PP-1000" (available from NOF Corp.) were mixed to prepare 140 parts of a monomer mixture solution.

Eighteen (18) parts of methyl ethyl ketone and 0.03 parts of 2-mercaptoethanol as a chain transfer agent as well as 10% (14 parts) of the monomer mixture solution above prepared were charged into a reaction vessel and mixed with each other, and then the inner atmosphere of the reaction vessel was fully replaced with nitrogen gas.

Separately, a mixed solution prepared by mixing the remaining 90% (126 parts) of the monomer mixture solution, 0.27 parts of the above chain transfer agent, 42 parts of methyl ethyl ketone and 3 parts of a polymerization initiator 2,2'-azobis(2,4-dimethylvaleronitrile) "V-65" (available from Wako Pure Chemical Industries, Ltd.) were charged into a dropping funnel. In a nitrogen atmosphere, the mixed solution in the reaction vessel was heated to 75° C. while stirring, and then the mixed solution in the dropping funnel was added dropwise thereinto over 3 h. After 2 h from completion of the dropwise addition while maintaining the resulting mixed solution at a temperature of 75° C., a solution prepared by dissolving 3 parts of the above polymerization initiator in 5 parts of methyl ethyl ketone was added to the mixed solution, and the resulting reaction solution was further aged at 75° C. for 2 h and at 80° C. for 2 h to obtain a water-insoluble polymer solution (weight-average molecular weight: 100,000). The solid content of the water-insoluble polymer solution was 60% by mass.

The weight-average molecular weight of the polymer was measured by gel permeation chromatography (GPC apparatus: "HLC-8120GPC" available from Tosoh Corp.; column: "TSK-GEL α-M" x2 available from Tosoh Corp.; flow rate: 1 ml/min)) using N,N-dimethyl formamide in which phosphoric acid and lithium bromide were dissolved in amounts of 60 mmol/L and 50 mmol/L, respectively, as an eluent, and using a polystyrene as a reference standard substance.

The solid content of the Water Dispersion of Pigment-Containing Water-Insoluble Polymer Particles was measured by the next procedure:

10 g of sodium sulfate dried to constant weight in a desiccator were weighed and charged in a 30 mL ointment container, and about 1.0 g of a sample was added to the container. The contents of the container were mixed and then accurately weighed. The resulting mixture was held in the container at 105° C. for 2 h to remove volatile components therefrom and further allowed to stand in a desiccator for 15 min to measure the mass thereof. The mass of the sample after removing the volatile components therefrom was regarded as the mass of solids therein. The solid content of the sample was calculated by dividing the mass of the solids by the mass of the sample added.

(ii) Preparation of Water Dispersion of Pigment-Containing Water-Insoluble Polymer Particles:

Sixty six (66) parts of the water-insoluble polymer produced by drying the water-insoluble polymer solution obtained as above described under reduced pressure were dissolved in 148 parts of methyl ethyl ketone. Added into the resulting solution were 18.8 parts of a 5N sodium hydroxide aqueous solution and 2 parts of a 25% ammonia aqueous solution as neutralizing agents, and 372 parts of ion-exchanged water, and then 100 parts of a black pigment Monarch® 800 (available from Cabot Corporation) were added to the resulting mixed solution to prepare a pigment mixture solution. The degree of neutralization of the pigment mixture solution was 100 mol %. The thus obtained pigment mixture solution was mixed at 20° C. for 1 h using a dispersion blade at 7000 rpm. The resulting dispersion was dispersed under a pressure of 180 MPa using a Microfluidizer "High-Pressure Homogenizer M-140K" (available from Microfluidics Corp.) by passing it through the device 15 times.

The obtained dispersion of the water-insoluble polymer particles was placed at 60° C. under reduced pressure to remove methyl ethyl ketone therefrom, followed by further removing a part of water therefrom. The resulting dispersion was subjected to centrifugal separation, and a liquid layer portion separated therefrom was filtered through a filter "Minisart Syringe Filter" (available from Sartorius Inc.; pore diameter: 5 μm; material: acetyl cellulose) to remove coarse particles therefrom, thereby obtaining a water dispersion of pigment-containing water-insoluble polymer particles. The solid content of the water dispersion was 20% by mass measured by the same method described in the previous example (i). Synthesis of Water-Insoluble Polymer, and the average particle size of the pigment-containing water-insoluble polymer particles, 100 nm, was measured using a laser particle analyzing system (available from Otsuka Electronics Co., Ltd.; Model No.: "ELS-8000"; cumulant analysis).

1.b Preparation of the Inkjet Ink Composition (Ink 1):

The next components were mixed at room temperature in the following described order to prepare 200 g of Ink 1.

A mixture of liquids was prepared in a beaker under stirring adding 50 g of ion exchanged water, 50 g of Emulgen® 120 (surfactant supplied by Kao Corporation) and 50 g of Surfynol 104PG50 (surfactant supplied by Air Products Chemicals Europe B.V.).

In a second beaker containing 60.0 g of 1,2-propanediol (available from Acros Organics) were added under stirring 10.4 g of the previous described mixture of liquids prepared, 37.7 g of ion exchanged water and 1.0 g of a 1N solution of NaOH. This liquid mixture was kept under stirring for 5 minutes.

Finally over a new beaker containing 63.6 g of the water dispersion of the pigment-containing water-insoluble polymer particles (solid content: 20% by mass prepared according to example 2.1) was poured the previous described mixture and at the end were added 27.3 g of Nychem™ 1571X12 (carboxylated butadiene acrylonitrile emulsion manufactured by Emerald Performance Materials with a solids content 43-45% wt and a Tg=−15° C.) The liquid mixture was kept under stirring for 5 minutes and filtered through a 5 μm-mesh filter (cellulose acetate membrane available from Sartorius AG).

1.c Preparation of the Inkjet Ink Composition (Ink 2):

The next components were mixed at room temperature in the described order to prepare 200 g of the Ink 2.

A mixture of liquids was prepared in a beaker under stirring adding 50 g of ion exchanged water, 50 g of Emulgen® 120 (Polyoxyethylene lauryl ether, supplied by Kao Corporation) and 50 g of Surfynol 104PG50 (acetylene glycol-based surfactants supplied by Air Products Chemicals Europe B.V.).

In a second beaker containing 60.0 g of 1,2-propanediol (available from Acros Organics) were added under stirring 10.4 g of the previous described mixture of liquids prepared, 39.4 g of ion exchanged water and 1.0 g of a 1N solution of NaOH. This liquid mixture was kept under stirring for 5 minutes.

Finally over a new beaker containing 63.6 g of the water dispersion of the pigment-containing water-insoluble polymer particles (solid content: 20% by mass prepared according to example 2.1) was poured the previous described mixture and at the end were added 25.5 g of Nychem™ 1578X1 (carboxylated ABS (acrylonitrile styrene butadiene) emulsion manufactured by Emerald Performance Materials with a solids content of 47% wt and a Tg=+18° C.). This liquid mixture was kept under stirring for 5 minutes and filtered through a 5 μm-mesh filter (cellulose acetate membrane available from Sartorius AG).

Table 1 summarizes all the prepared inkjet ink compositions:

TABLE 1

Ink compositions (Quantities expressed in grams)

| Ink Components | Ink 1 Invention example | Ink 2 Invention example |
|---|---|---|
| Nychem ™ 1571X12 (carboxylated butadiene acrylonitrile emulsion, 43-45% wt solids content, Tg = −15° C.) | 27.3 | — |
| Nychem ™ 1578X1 (carboxylated ABS emulsion, 47% wt solids content, Tg = +18° C.) | — | 25.5 |
| Emulgen ® 120/Surfynol 104PG50/Water 1/1/1 | 10.4 | 10.4 |
| 1,2-propanediol | 60.0 | 60.0 |
| 1N solution of NaOH | 1.0 | 1.0 |
| water dispersion of the pigment-containing water-insoluble polymer particles | 63.6 | 63.6 |
| Water (balance) | 37.7 | 39.4 |

Example 2: Performance of Abrasion Resistance and Solvent Resistance of the Inkjet Ink Compositions 2.1 Ink Application by Spiral Bar:

Three different non absorbing recording substrates were used:

PET A4 sheets type Bonpet 8A available from Bonset America Corporation (water absorption of 0.77 g/m$^2$ with a contact time of recording medium with water of 104.7 ms)

PET A4 sheets type Lumirror-75T60 available from Toray Corporation (water absorption of 1.08 g/m$^2$ with a contact time of recording medium with water of 104.7 ms)

PVC A4 sheets type Renolit Shrink TD57S available from Renolit AG (water absorption of 1.01 g/m$^2$ with a contact time of recording medium with water of 104.7 ms)

The method to obtain the absorption values is as described in patent application WO2014098001, wherein the length per sampling (degree) is 90, and the number of sampling points is 21.

Over the non absorbent recording substrate A4 sheet were dropped 2 mL of the ink prepared according to the previously described examples. Using one spiral bar coater (Elcometer 4361004) a 10 μm thick homogeneous continuous ink surface coating was prepared in the non absorbing recording media.

The coated recording substrates samples were dried in an oven at 60° C. for 60 minutes.

The dried ink coated non absorbing recording substrates were let cool down at room temperature for 30 minutes before starting the ink properties evaluation.

2.2 Abrasion Resistance Method:

The abrasion resistance was determined using a rub tester equipment. The ink coated non absorbing recording substrate A4 sample was inserted and fixed in the centre of the rub tester equipment.

A friction block was used and a paper strip fixed on the friction block side to be in contact with the ink coated non absorbing recording substrate; then the friction block was inserted into the rub tester equipment carriage and moved forward and back with an uniform speed along the ink coated non absorbing recording substrate.

This movement of the friction block was done 10 times for the PET substrates and 100 times for the PVC substrate.

Then the Optical Density on the rubbed area and in the non-rubbed area was measured.

The Optical Density was determined using a Gretag Macbeth densitometer model D19C.

The Percentage of Retained Optical Density was calculated according to the formula:

$$\text{Retained } OD \text{ (\%)} = \frac{OD \text{ of rubbed area}}{OD \text{ of non rubbed area}} \times 100$$

2.3 Solvent Resistance Method:

The solvent resistance was measured using cotton ear wipes soaked with a solution 20% w/w ethanol/water. The ink coated non absorbing recording substrate A4 sample was rubbed with a previously soaked (solution 20% w/w ethanol/water) cotton ear wipe.

The soaked ear wipe was moved by hand forward and backward with an uniform speed along 2 cm of the ink coating the non-absorbing recording substrate until it was clearly seen that the ink surface was peeled off and the ink coated layer was damaged.

A ranking was made counting the number of movements needed to damage the ink coated surface. As more movements are needed, the solvent resistance of the ink coated with the non absorbing recording substrate layer is higher, thus the performance of the evaluated ink is better.

Table 2 shows the ranking of solvent resistance

TABLE 2

| Solvent resistance ranking | |
|---|---|
| Ranking | Number of ear wipe movements needed to damage the ink layer surface |
| 1 | 1 to 2 |
| 2 | 3 to 5 |
| 3 | 5 to 7 |
| 4 | 8 to 10 |
| 5 | More than 10 |

2.4 Evaluation Results

The results for abrasion resistance and solvent resistance are shown in Table 3.

TABLE 3

| | Substrate 1: PET Bonpet 8A | | Substrate 2: PET Lumirror-75T60 | | Substrate 3: Renolitshrink TD575 | |
|---|---|---|---|---|---|---|
| Ink | Abrasion resistance (%) | Solvent resistance: ranking | Abrasion resistance (%) | Solvent resistance: ranking | Abrasion resistance (%) | Solvent resistance: ranking |
| Ink 1 containing carboxylated butadiene acrylonitrilE emulsion-invention example | 71.4 | 1 | 73.8 | 1 | 77.5 | 3 |
| Ink 2 containing carboxylated ABS emulsion-invention example | 76.8 | 1 | 81.9 | 1 | 86.2 | 5 |

According to the ink evaluation results, it can be seen that using the PET non-absorbing recording medium (Substrate 1 and 2) the results of abrasion resistance of Inks 1 and 2 are excellent).

The evaluation results when PVC is used as the non-absorbing recording medium (Substrate 3) show that the solvent resistance results of Inks 1 and 2 are also very good.

In addition, it can be seen that the results of abrasion resistance of Inks 1 and 2 show good results regardless the nature of the recording medium. The evaluation results for solvent resistance show that solvent resistance of Inks 1 and 2 is also very good, particularly for PVC non-absorbing recording medium.

The modifications which do not affect, alter, change or modify the essential aspects of the described compositions are included within the scope of the present invention.

The invention claimed is:

1. An inkjet printing composition comprising:
   (a) an aqueous liquid vehicle;
   (b) at least a pigment;
   (c) at least a nitrile polymer emulsion comprising at least one of carboxylated acrylonitrile butadiene styrene polymer emulsion.

2. The inkjet printing composition according to claim 1 comprising:
   (a) 1 to 15 wt. % of the at least a pigment;
   (b) 1 to 15 wt. % of solid content of the at least a nitrile polymer emulsion comprising at least one of carboxylated acrylonitrile butadiene styrene polymer emulsion.

3. Use of an inkjet printing composition according to claim 1 in an inkjet printing system, wherein the inkjet printing composition in the inkjet printing system is ejected onto a recording medium for inkjet printing to print images or characters thereon.

4. The inkjet printing composition according to claim 1 comprising:
   (a) 3 to 8 wt. % of the at least a pigment;
   (b) 3 to 9 wt. % of solid content of the at least a nitrile polymer emulsion comprising at least one of carboxylated acrylonitrile butadiene styrene polymer emulsion.

5. The inkjet printing composition according to claim 1, wherein:
   (a) the aqueous liquid vehicle comprises a co-solvent; and wherein the inkjet printing composition further comprises:
   (b) at least a surfactant.

6. The inkjet printing composition according to claim 5 comprising:
   (a) the aqueous liquid vehicle, wherein the aqueous liquid vehicle comprises 10-60 wt. % of the co-solvent;
   (b) 1 to 15 wt. % of the at least a pigment;
   (c) 1 to 15 wt. % of solid content of the at least a nitrile polymer emulsion comprising at least one of carboxylated acrylonitrile butadiene styrene polymer emulsion;
   (d) 0.1 to 10 wt. % of the at least a surfactant.

7. The inkjet printing composition according to claim 5 comprising:
   (a) the aqueous liquid vehicle, wherein the aqueous liquid vehicle comprises 20 to 40 wt. % of the co-solvent;
   (b) 3 to 8 wt. % of the at least a pigment;
   (c) 3 to 9 wt. % of solid content of the at least a nitrile polymer emulsion comprising at least one of carboxylated acrylonitrile butadiene styrene polymer emulsion;
   (d) 0.5 to 6 wt. % of the at least a surfactant.

8. An inkjet printing system comprising:
   (i) the inkjet printing composition according to claim 1;
   (ii) a recording medium; and
   (iii) an inkjet printer.

9. The inkjet printing system according to claim 8 wherein the recording medium is a low-liquid absorbing or a non-liquid absorbing recording medium.

10. The inkjet printing system according to claim 8 wherein the inkjet printer comprises a heating device.

11. A method of forming a printed image with an inkjet printing system according to claim 8, comprising:
    filling a container comprised within the inkjet printer equipped with an ink ejecting means with the inkjet printing composition;
    ejecting the inkjet printing composition onto the recording medium to print images or characters thereon.

12. The method of forming a printed image according to claim 11, wherein the inkjet printer further comprises a heating device.

13. The method as in claim 11, wherein the inkjet printing composition further comprises:
    (a) at least a surfactant.

* * * * *